United States Patent
Ramamurthi et al.

(10) Patent No.: US 9,028,998 B2
(45) Date of Patent: May 12, 2015

(54) BATTERY CELL DESIGN AND METHOD OF COOLING BATTERY CELLS

(71) Applicant: General Electric Company, Schenectady, NY (US)

(72) Inventors: Badri Narayan Ramamurthi, Clifton Park, NY (US); Satoshi Atsuchi, Rexford, NY (US); Andrey I. Meshkov, Niskayuna, NY (US); Mohamed Rahmane, Ballston Lake, NY (US); Svetlana Selezneva, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 150 days.

(21) Appl. No.: 13/767,066

(22) Filed: Feb. 14, 2013

(65) Prior Publication Data

US 2013/0157088 A1   Jun. 20, 2013

Related U.S. Application Data

(63) Continuation-in-part of application No. 13/117,542, filed on May 27, 2011, now abandoned.

(51) Int. Cl.
*H01M 10/50* (2006.01)
*H01M 10/656* (2014.01)
*H01M 4/78* (2006.01)
*H01M 10/34* (2006.01)
*H01M 10/36* (2010.01)
*H01M 10/39* (2006.01)
*H01M 10/613* (2014.01)
*H01M 2/20* (2006.01)
*H01M 4/64* (2006.01)

(52) U.S. Cl.
CPC ............ *H01M 10/5061* (2013.01); *H01M 2/20* (2013.01); *H01M 4/64* (2013.01); *H01M 4/78* (2013.01); *H01M 10/345* (2013.01); *H01M 10/36* (2013.01); *H01M 10/39* (2013.01); *H01M 10/5004* (2013.01); *Y02E 60/124* (2013.01)

(58) Field of Classification Search
CPC .................................. H01M 2/20; H01M 4/64
USPC ........................................................ 429/120
See application file for complete search history.

(56) References Cited

U.S. PATENT DOCUMENTS 3,879,226 A    4/1975   Tomonaga
3,982,957 A *  9/1976   Jones et al. ................... 429/163

(Continued)

FOREIGN PATENT DOCUMENTS

JP        41119440 A       7/1999
WO     2010135456 A2     11/2010

*Primary Examiner* — Jane Rhee
(74) *Attorney, Agent, or Firm* — Joseph J. Christian

(57) ABSTRACT

The battery cell design includes a battery cell component comprises a current conducting element, that includes at least a portion that is hollow, further component is configured to be located within a battery cell. Another embodiment of the component comprises a first element that defines a first fluid path therein; and a second element that defines a second fluid path, wherein the two fluid paths are in communication with each other, further wherein the battery cell component is configured to conduct electric current. A battery cell and battery cell assembly that uses the component, and a method of cooling a battery assembly is also disclosed. The present invention has been described in terms of specific embodiment(s), and it is recognized that equivalents, alternatives, and modifications, aside from those expressly stated, are possible and within the scope of the appending claims.

18 Claims, 5 Drawing Sheets

(56) References Cited

U.S. PATENT DOCUMENTS

| | | | |
|---|---|---|---|
| 4,044,191 A * | 8/1977 | Evans et al. ................ | 429/104 |
| 5,501,916 A | 3/1996 | Teramoto et al. | |
| 7,641,996 B2 | 1/2010 | Imanishi et al. | |
| 7,838,064 B2 | 11/2010 | Nakanishi et al. | |
| 2011/0050235 A1 | 3/2011 | Bogan, Jr. et al. | |

* cited by examiner

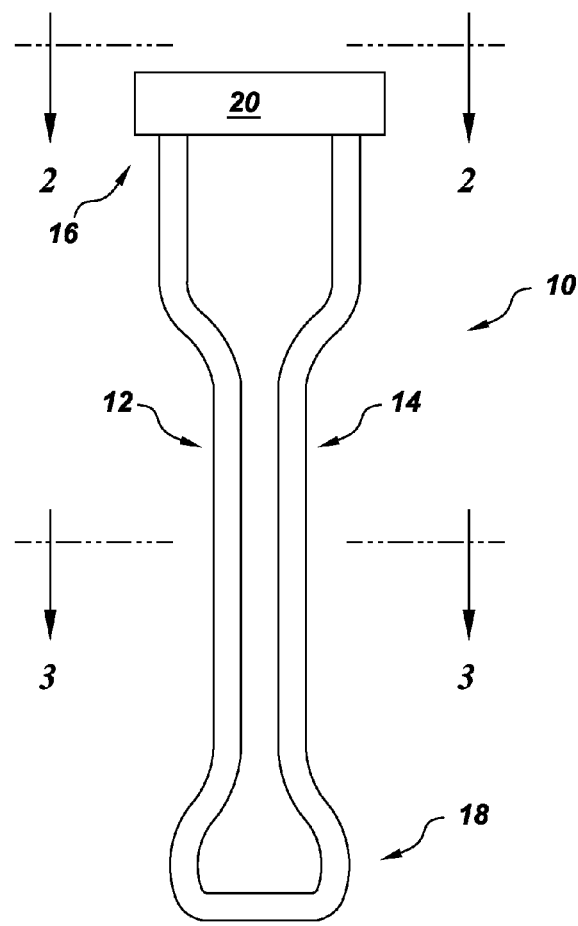
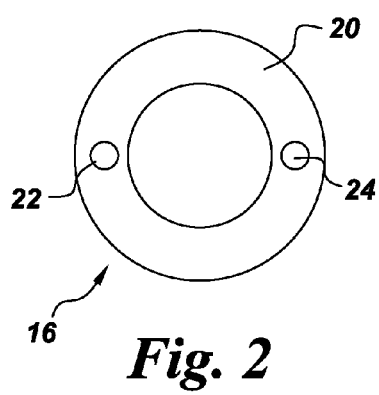
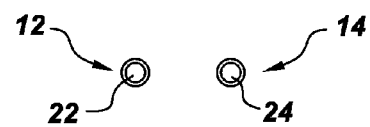
Fig. 1
Fig. 2
Fig. 3 ated carrying out the invention.

BATTERY CELL DESIGN AND METHOD OF COOLING BATTERY CELLS

CROSS-REFERENCE TO RELATED APPLICATION

This application is a Continuation-In-Part (CIP) application of commonly assigned, U.S. patent application Ser. No. 13/117,542, entitled "BATTERY CELL DESIGN AND METHOD OF COOLING BATTERY CELLS", filed on May 27, 2011, the contents of which are hereby incorporated by reference in their entirety.

BACKGROUND OF THE INVENTION

The present invention relates generally to battery cells and more particularly to a battery cell design including a battery cell component, a battery cell having the component, a battery pack assembly, and a method of cooling battery cells in the battery pack assembly.

Battery cells, depending on the particular technology employed, have optimal or improved performance in certain temperature ranges. Performance and/or degradation rates worsen when operated outside the temperature ranges. Accordingly, various thermal control systems are employed to aid in getting the battery cell to operate within the temperature range.

One thermal management method used with sodium-based battery cells is employing a system having an electric heater plate located at the top of the battery cells and a series of interstitial air cooling structures or panels. The air-cooling structures or panels are located between the rows of battery cells, which are typically arranged in a cell array (i.e., battery cell assembly). When battery cooling is needed, air is pushed through the duct of the cooling panel, thereby directing air first to the outside casing of the battery cells. Meanwhile, heat transfer is from the core of the cell to the air via the anode compartment; then the cell case steel wall; then the electrical insulation; then the wall of the cooling panel; and, then finally to the air. A disadvantage of this system is the indirect cooling of the core of the cell and the long path for the heat flow from the source to the sink. Additionally, the anode compartment is only partially filled with sodium, which is a good conductor. In fact, under normal operating conditions, the Na level in the anode compartment typically never exceeds about 40% of the available volume at any stage of the charge/discharge cycle. This method is limited in terms of how fast and how effective the cathode will be cooled to keep its temperature in the desired operating ranges under cycling conditions. This method is therefore cumbersome, heavy, expensive, and inefficient.

Accordingly, there is an ongoing need for improving upon the effectiveness of the various thermal management methodologies for battery cells.

BRIEF DESCRIPTION

The present invention overcomes at least some of the aforementioned drawbacks by providing a battery cell component that aids in improving the thermal properties of a battery cell and/or battery cell assembly. More specifically, the present invention is directed to provide a battery cell component (e.g., current collector) that by including a hollow portion is able to more effectively and simply cool (and/or heat) the battery cells and/or battery cell assembly that use the component.

Therefore, in accordance with one aspect of the invention, a battery cell component comprises a current conducting element, wherein a portion of the current conducting element is hollow, further wherein the battery cell component is configured to be located within a battery cell.

In accordance with another aspect of the invention, a battery cell component comprises a first element defining a first fluid path therein; and a second element, defining a second fluid path, wherein the second fluid path is in fluid communication with the first fluid path, further wherein the battery cell component is configured to conduct electric current.

In accordance with another aspect of the invention, a battery cell comprises an anode; a cathode in communication with the anode; and a current collector, wherein a portion of the current collector is hollow, thereby defining a fluid path containing a fluid therein.

In accordance with another aspect of the invention, a battery pack assembly comprises a plurality of battery cells in electrical communication, wherein each of the plurality of battery cells comprise: an anode; a cathode in communication with the anode; and a current collector, wherein a portion of the current collector is hollow, thereby defining a fluid path therein; and a cooling system in fluid communication with the fluid path, the cooling system comprising at least one fluid channel.

In accordance with another aspect of the invention, a method of cooling comprises: connecting a cooling system to a battery pack assembly, said battery pack assembly comprising a plurality of battery cells electrically connected to each other, the cooling system comprising at least one fluid channel containing a fluid therein, the at least one fluid channel being in thermal communication with the plurality of battery cells; circulating a fluid in the least one fluid channel, thereby controlling a temperature of the plurality of battery cells.

Various other features and advantages of the present invention will be made apparent from the following detailed description and the drawings.

BRIEF DESCRIPTION OF THE DRAWINGS

The drawings illustrate one embodiment presently contemplated for carrying out the invention.

FIG. 1 is a side elevation view of a battery cell component, in accordance with embodiments of the present invention.

FIG. 2 is a top view of the battery cell component of FIG. 1, in accordance with embodiments of the present invention.

FIG. 3 is a top sectional view of the battery cell component along sections lines 3-3 in FIG. 1, in accordance with embodiments of the present invention.

DETAILED DESCRIPTION

Figure 4:
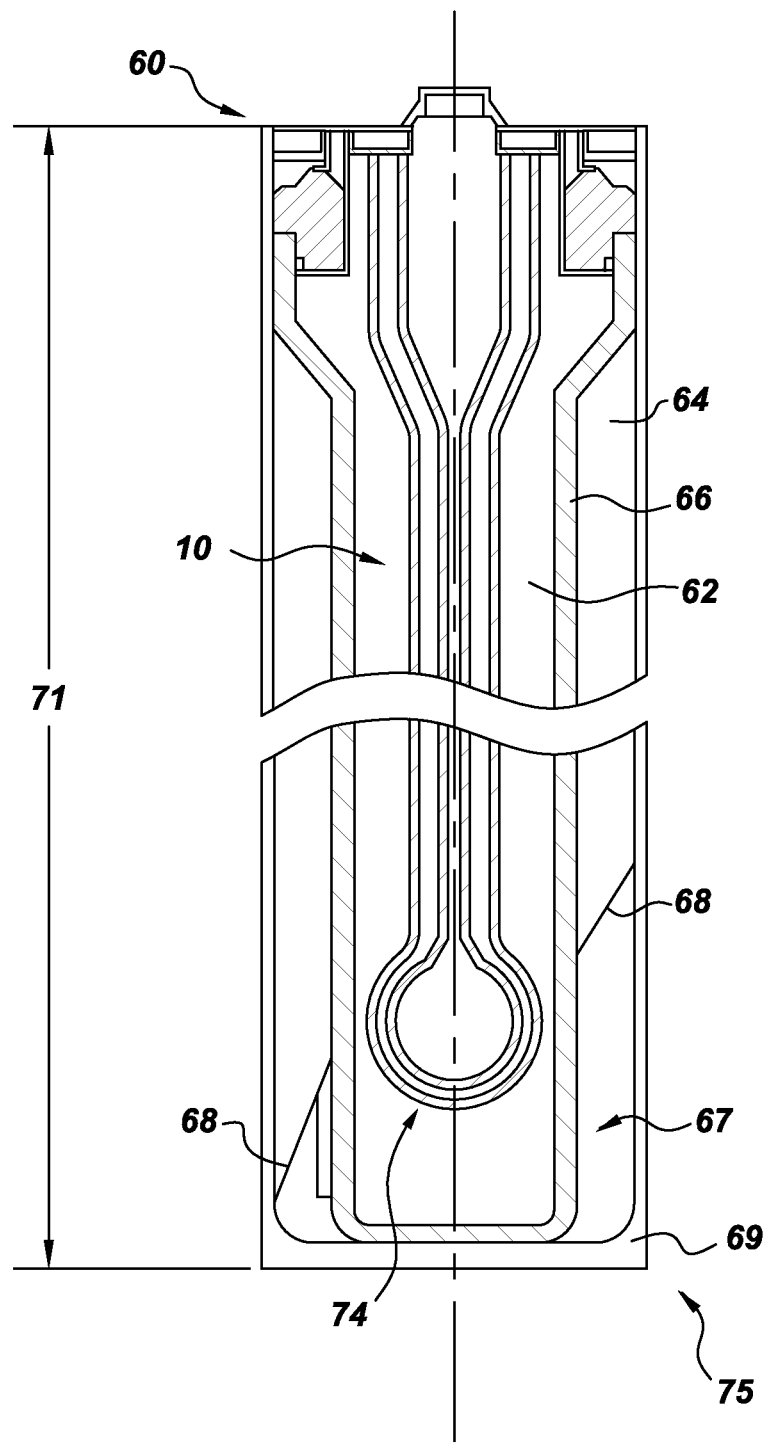
FIG. 4 is a side sectional view of a battery cell, in accordance with embodiments of the present invention.

Aspects of the present invention have been shown to offer advantages over previous methodologies of thermal management of battery cells. The battery cell component, battery cell that employs the component, a battery cell assembly, and method of cooling battery cells offer advantages in thermal management.

Aspects of the present invention provide for a hollow current collector so that fluid (e.g., air) may be circulated in and out of the hollow current collector. In this manner, improved heat transfer at and near the cathode, where most heat is generated, is realized. The cathode may be directly cooled, thereby rendering the need for cooling panels and the like moot. As a result, every battery cell in a batter cell assembly will see the same cooling rate.

As will be discussed herein the geometry of the current collector and/or battery cell component may be such that the surface area is maximized so as to improve heat transfer from the cathode area to the fluid within the fluid path(s) in the battery cell component. For example, portions of the battery cell component may be spiral, helical, coiled, and the like. Additional benefits of aspects of the present invention are that less cathode materials are in the core area of the battery cell and lighter weight. In other embodiments, portions of the battery cell component may be wrapped around a large element (e.g., tube) so as to further reduce the weight of the battery core.

Aspects of the present invention may be used with a Sodium-Metal Halide (Na-MH) battery cell, a Sodium-Nickel Chloride (Na—NiCl2) battery cell, and the like. An acceptable operating range for these types of sodium-based battery cells is from about 280° C. to about 350° C. Optimal operating temperature for Na-MH battery cells is about 300° C. For best performance and low degradation rates, it is desirable to keep the operating temperature within about a 50° C. temperature range.

Most of the heat is generated in the core of the battery cell (cathode area) via joule heating and chemical reactions. Because cell performance and its degradation rates are sensitive to the cathode temperature, it is desirable to extract the heat effectively from this core region of the battery cell. Aspects of the present invention address various shortcomings by cooling the cathode through the use of a hollow current collector. This will allow direct and effective cooling of the cathode where most of the heat is generated. Aspects of the design, beside effective thermal management, will also aid in significantly reducing the weight of the battery cell, thereby increasing energy and power densities.

Referring to FIG. 1, a side elevation view of a battery cell component, in accordance with embodiments of the present invention, is shown. The battery cell component 10 may comprise a first element 12 and a second element 14 wherein the first element 12 and a second element 14 define a first fluid path 22 and a second fluid path 24 respectively therein. As shown the battery cell component 10 comprises a first end 16 and a second end 18 that is distal to the first end 16. At the first end 16 the battery cell component 10 may include an annulus 20. As shown the first element 12 and the second element 14 may be connected to each other, though in other embodiments they may not be connected. The battery cell component 10 may further be configured to conduct electrical current, thereby effectively acting as a current conducting element when employed within a battery cell (see e.g., FIG. 4).

Referring to FIG. 2, a top view of the battery cell component 10 of FIG. 1, in accordance with embodiments of the present invention, is shown. The annulus 20 at the first end 16 of the battery cell component 10 shows the first fluid path 22 within the first element 12 and the second fluid path 24 with the second element 14. FIG. 3 shows a sectional view of the battery cell component 10 along sections lines 3-3 in FIG. 1, in accordance with embodiments of the present invention. As shown, the first element 12 has a first fluid path 22 therein and the second element 14 has a second fluid path 24 similarly therein. As depicted, at least a portion of the first element 12 and the second element 14 is hollow.

It should be apparent to those in the art that various shapes and configurations of elements in the battery cell element 10 may be employed, other than those depicted, without departing from aspects of the present invention. For example, either or both of the first element 12 and the second element 14 may be substantially longitudinal in shape. Similarly, the cross section of the first fluid path 22 and the second fluid path 24 may differ from that shown in the figures. The cross section, for example, of the fluid path 22, 24 may be a shape other than circular. The cross section shape and dimensions may differ in the first fluid path 22 from the second fluid path 24. Similarly, the cross section shape and dimensions of either fluid path 22, 24 may differ along the length of the fluid path 22, 24.

The cross-section shape of the battery cell element 10 does not have to be circular. In order to improve battery cell performance, the shape of the outer surface of the battery cell element 10 may be the same shape as the Beta Alumina tube (e.g., cloverleaf). In this manner, the battery cell element 10 will conform with the moving front of the reaction as a function of charge/discharge.

The battery cell component 10 may be constructed of any suitable material or combination of materials. In embodiments, at least a portion of the battery cell component 10 is constructed of an electrical conducting material. In an embodiment, the electrical conducting material comprises a metal, an alloy, or combinations thereof. The metal may comprise nickel (Ni), a Nickel alloy, Mo, and the like. For example, in an embodiment at least one of the first element 12 and the second element 14 are constructed of a current conducting material. The outer surface of the battery cell component, being adjacent to a cathode should be constructed of a material that is compatible with the cathode.

The battery cell component 10 is one embodiment of the present invention which may be used as a current collector in various sodium-based battery cells. For example, the component 10 may be used in a Sodium-Metal Halide (Na-MH), Sodium-Nickel Chloride (Na—NiCl$_2$), battery, or the like.

FIG. 4 shows a side sectional view of a battery cell 60, in accordance with embodiments of the present invention. The battery cell 60 includes the battery cell component 10 therein. In one embodiment, the battery cell 60 is a high-temperature rechargeable sodium-metal halide cell. Typically a high-temperature rechargeable sodium-metal halide cell consists of a metal halide cathodic material and a molten sodium anodic material, separated by solid sodium conducting "beta"-alumina ceramic tube. The source electrochemical cell, or battery cell 60 comprises a cathode compartment 62 comprising a cathodic material (not shown in figure), an anode compartment 64 comprising an anodic material (not shown in figure), a current collector, or battery cell component 10, shims 68 a separator 66, and an electrolyte reservoir, for example a non woven carbon fiber wick enclosed in a casing 69. A battery cell component 10 is connected to the cathode compartment 62. The cathode compartment 62 comprising the cathodic material (not shown in figure) is located inside the separator 66. The cathodic material mainly consists of metal halide, in case of a sodium-metal halide cell 60. In one embodiment, very fine, filamentary Inco Nickel-255 (obtained from Vale Inco) is compacted and granulated with pure, milled sodium chloride (obtained from Custom Powders Limited) for loading into the cathode compartment 62. About 50 percent of the cathodic material volume as built comprises granulated nickel and sodium chloride. The remaining portion of the cathode compartment 62 inside the separator 66 is filled with the molten salt electrolyte; sodium aluminum tetrachloride ($NaAlCl_4$) which has a melting point of approximately about 160 degrees Celsius. The working temperature of the source battery cell 60, when it is a sodium-metal halide cell, is about 300 degrees Celsius. As mentioned above, the cathode compartment 62 includes a U-shaped battery cell component, or current collector 10. In one embodiment, the current collector 10 runs down the length 71 of the source electrochemical cell 60 with a bend 74 at the bottom 75 of the source electrochemical cell 60. In one embodiment, an electrolyte reservoir, for example a non woven fiber wick such as carbon fiber felt is placed between the two sides of the cathode current collector 10 to act as a reservoir for excess molten electrolyte during the volume changes that occur during the normal discharging and charging of the source electrochemical cell 60.

In one embodiment, the separator 66 is a solid ceramic tube that separates the cathode compartment 62 and the anode compartment 64, both physically and electronically. In one embodiment, the separator 66 is a sodium beta-alumina solid electrolyte, which functions as a secondary electrolyte. In one embodiment, the ceramic used for this tube, sodium-conducting beta-alumina, is a good conductor of $Na^+$ ions at the normal operating temperature for the source electrochemical cell 60 of about 300 degrees Celsius. In one embodiment, the separator 66 is shaped like a cloverleaf. The use of a cloverleaf provides increased surface area of the secondary electrolyte when compared to a circular tube. In certain embodiments, the outer surface 67 of the separator 66 is coated with conductive carbon paint (not shown in figure), which facilitates electrical contact to the separator 66 during the initial charge, where there is no molten anodic material, for example, sodium present at the start.

In one embodiment, the anode compartment 64 comprises an anodic material (not shown in figure). In one embodiment, the anodic material comprises molten metallic sodium when the source electrochemical cell 60 is a sodium-metal halide cell. The anode compartment 64 is connected to an anode current collector (negative electrode, not shown in figure). As used herein, cathodic material is the material that supplies electrons during charge and is present as part of a redox reaction. Anodic material accepts electrons during charge and is present as part of the redox reaction.

In certain embodiments, in addition to the carbon paint on the outer surface 67 of the separator 66, there are metal shims 68 pressing against the outer surface 67 of the separator 66, which provide electrical contact to the separator 66. The metal shims 684 in addition create a space for the sodium to wick and wet the entire outer surface 67 of the separator, even when the sodium level in the compartment is relatively low.

As is known, the cathode and anode are in communication with each other through the solid electrolyte. By employing the battery cell component 10 of the present invention improved thermal control of the battery cell 60 is achieved. Passive and/or active movement of a fluid in the first and second fluid paths 22, 24 improves the removal of heat from a core region and the cathode area of the cell 60.

Any suitable fluid or combination of fluids may be used in the first fluid path 22 and the second fluid path 24. The fluid may comprise a gas, a liquid, or combinations thereof. The gas may comprise air.

The battery cell 60 may be constructed of any suitable material or combination of materials. The battery cell 60 that uses the current collector may be any of a variety of sodium-based battery cells. For example, the battery cell 60 may be a Sodium-Metal Halide (Na-MH) battery, Sodium-Nickel Chloride ($Na-NiCl_2$) battery, or the like.

Figure 5:
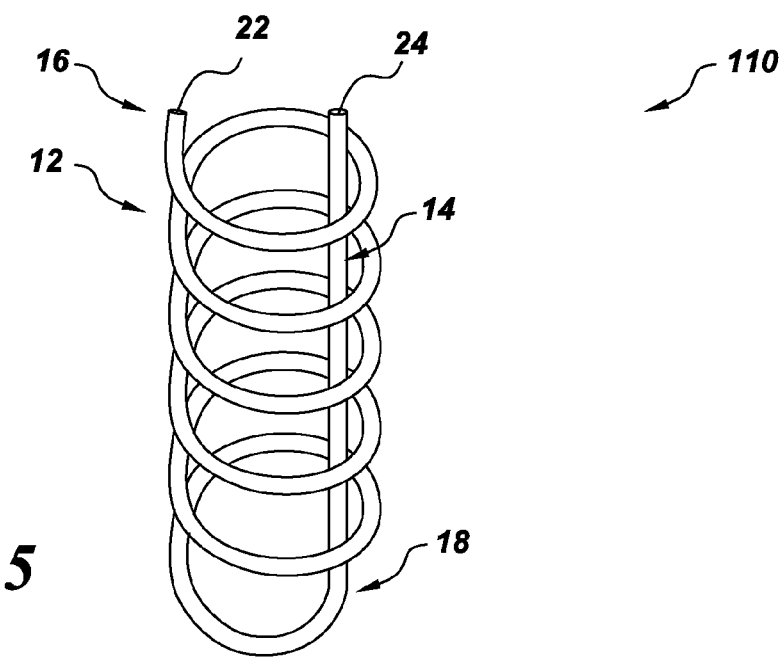
FIG. 5 is a side elevation view of a battery cell component, in accordance with another embodiment of the present invention.

Referring to FIG. 5, a side elevation view of a battery cell component 110, in accordance with another embodiment of the present invention, is shown. The battery cell component 110 may comprise an upper end 20 and a lower end 18, distal to the upper end 20. As shown, a first element 12 that defines a first fluid path 22 therein, may have a substantially helical configuration. The second element 14 that defines a second fluid path 24 therein may comprise a substantially straight configuration. In other embodiments (not shown), both the first element 12 and the second element 14 may comprise substantially helical configurations. The first element and the second element 14 may be interleaved.

Figure 6:
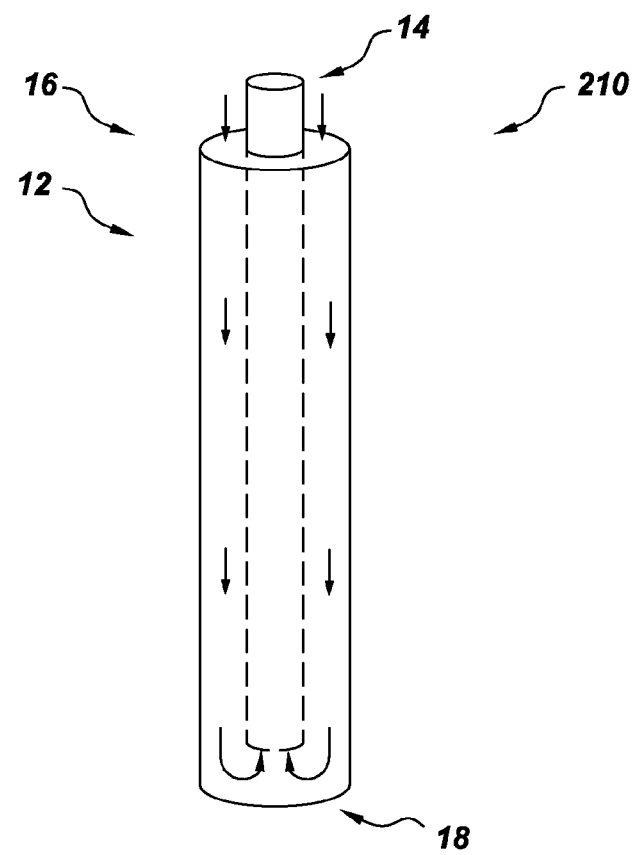
FIG. 6 is a side elevation view of a battery cell component, in accordance with another embodiment of the present invention.

Referring to FIG. 6, a side elevation view of a battery cell component 210, in accordance with another embodiment of the present invention, is shown. The battery cell component 210 may comprise an upper end 20 and a lower end 18, distal to the upper end 20. As shown, a first element 12, that defines a first fluid path 22 therein, may be substantially concentric with the second element 14, that defines a second fluid path 24 therein. In one embodiment of the invention, the outer fluid path includes a fluid stream that flows from top to bottom while the inner fluid path includes a fluid stream that flows from bottom to top. In another embodiment of the invention, the fluid streams may be reversed and the fluid stream in the outer fluid path may flow from bottom to top while the fluid stream in the inner fluid path may flow from top to bottom.

Referring once again to the configuration in FIG. 6, the fluid paths defined therein includes two streams of fluids such that the two streams are flowing in opposite directions and are in thermal communication with each other. Further, one end of the fluid paths is open to an exterior of the current collector. By this configuration, fluid streams are forced in and out of the cooling structure and thereby, heat is removed from the central portion of the cathode by forced convection and the cathode does not remain hot at the central portion. In one embodiment of the invention, the amount of heat removal by forced convection, and thereby the cathode temperature, are controlled by adjusting the flow-rates of the fluids in and out of the current collector. Furthermore, heat removal by forced convection is more effective than by natural convection. Further, the thermal communication between the two opposing fluid streams creates a more uniform temperature along the fluid paths and along the height of the cell. Over a long period of time, a uniform temperature accomplishes low degradation rate of the battery cell. Thus, heat removal from the central portion of the cathode by forced convection and the resulting uniform temperature are means of effective thermal management of the battery.

Figure 7:
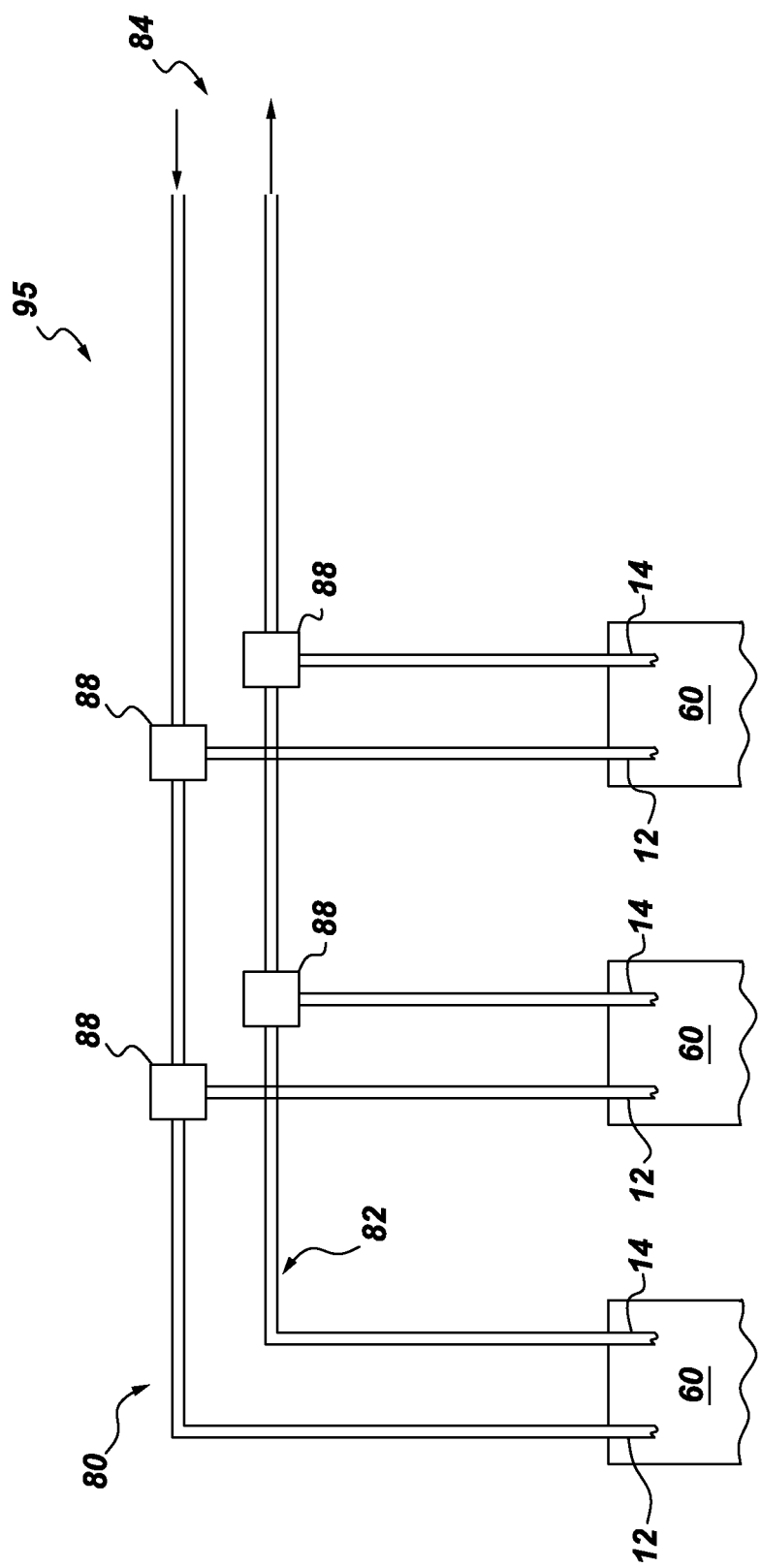
FIG. 7 is a schematic diagram view of a battery pack assembly, in accordance with an embodiment of the present invention.

Referring to FIG. 7, a schematic diagram view of a battery pack assembly 80, in accordance with an embodiment of the present invention, is shown. The battery pack assembly, or assembly 80 comprises a plurality of battery cells 60 that are in electrical communication with each other. The method of electrically connecting the battery cells 60 is not shown for clarity purposes. Each of the battery cells 60 may comprise anode, cathode (not shown) and any of the current collector and/or battery cell components 10, 110, 210 discussed herein. As shown, each of the battery cells 60 have a component 10, 110, 210 that has a current collector that has a portion that is hollow. As such, each component 10, 110, 110 includes at least one of a first fluid path 12 and a second fluid path 14 extending therefrom.

The assembly 80 further comprises a cooling system 90 in fluid communication with at least one of the first fluid path 12 and the second fluid path 14. The cooling system 90 comprises at least one fluid channel 82 that may be connected to at least one of the first fluid path 12 and the second fluid path 14. For example, as shown the fluid channel 82 may comprises two fluid channels 82 wherein a first fluid channel 82 is connected to each of the first fluid paths 12 in each of the plurality of battery cells 60. The second fluid channel 82 is connected to each of the second fluid paths 14 in each of the plurality of battery cells 60. As shown, a distal end 84 of the cooling system 90 may be open to atmosphere. The cooling system 80 acting in fluid communication with the first fluid path 12 and the second fluid path 14 comprise an open loop system. In this manner, heat generated predominantly in the cores (e.g., cathodes) of the plurality of battery cells 60 is effectively transferred via a fluid located in the first and second fluid paths 12, 14 to the at least one fluid channels 82 and to atmosphere at the distal end 84.

Any suitable fluid may be used in the first fluid path 12, the second fluid path 14, and/or the at least one fluid channel 82. The fluid may comprise a liquid, a gas, and combinations thereof. The gas may comprise air.

Because the plurality of battery cells 60 are electrically connected to each other, the cooling system 80 may further comprise a plurality of insulating elements 88 located at each juncture of the fluid channels 82. The plurality of insulation elements 88 may comprise any suitable material that electrically isolates each of the battery cells 60 from each other. For example, the plurality of insulation elements 88 may comprise a material such as mica, a ceramic, polytetrafluoroethylene, plastic, rubber, and the like.

Although not shown in FIG. 7 it should be apparent to on in the art, that any embodiment of battery cell component and current conducting element, 10, 110, 210 of the present invention may be employed with the battery cell assembly 90 as described herein. Similarly, any embodiment of battery cell 60 of the present invention may be used with the battery cell assembly 90 of the present invention. The battery cells 60 used in the battery cell assembly 90 may comprise a sodium-based battery cell. For example, the battery cell 60 may comprise a Sodium-Metal Halide (Na-MH) battery, Sodium-Nickel Chloride (Na—NiCl$_2$) battery, or the like.

Figure 8:
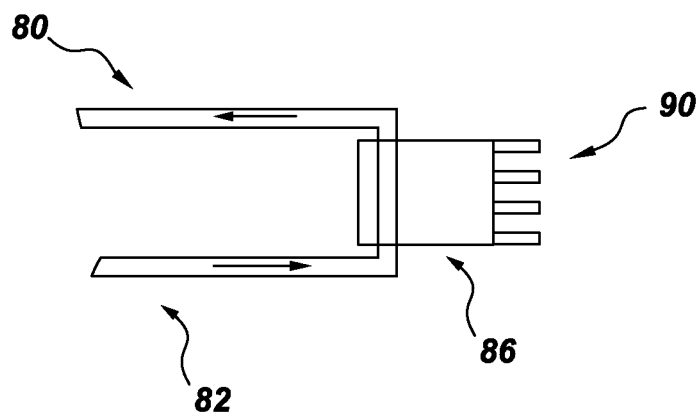
FIG. 8 is a schematic diagram view of a portion of a battery pack assembly, in accordance with another embodiment of the present invention.
Figure 9:
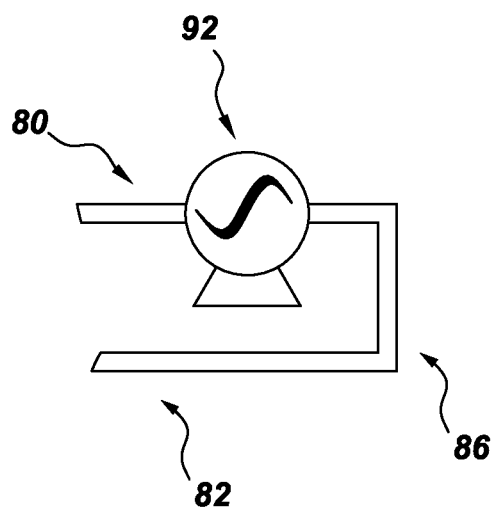
FIG. 9 is a schematic diagram view of a portion of a battery pack assembly, in accordance with another embodiment of the present invention.

Referring to FIGS. 8 and 9, schematic diagram views of a portion of a battery pack assembly 90, in accordance with two embodiments of the present invention, are shown. As FIG. 8 depicts the cooling system 80 that is a closed loop system. In this manner the fluid in the at least one fluid channel 82 is not open to atmosphere. The cooling system 80 thereby may comprise a heat exchanger 91 that may aid in the heat transfer of the fluid in the at least one fluid channel 82. As shown in FIG. 9, the cooling system 90 may comprise a pump 92. The pump 92 may be any suitable type of fluid pumping means to aid in the movement of a fluid in the at least one fluid channel 82.

A battery thermal model has been developed and validated. The cooling performance results of one such model showed that with appropriate air flow rate through the current collector, the maximum and minimum cathode temperature may be maintained within the prescribed specifications. Further, the battery cell case and cathode temperatures were discovered to be almost identical. This suggests that aspects of the present design directly and efficiently cool the cathode.

While the embodiments illustrated and described herein were often described for use with a sodium-based battery cells, aspects of the present invention may be used for thermal control of other types of battery cells without departing from the scope of the invention. For example, aspects of the present invention may be used for dry-cell batteries such as Sodium-Metal Halide batteries, Sodium-Nickel Chloride batteries, Sodium-Sulfur batteries, Nickel-Metal Hydride batteries, and the like. Similarly, while the embodiments illustrated and described herein for the battery cell component were often described for use concurrently as a current collector, aspects of the present invention may be used independently from concurrent use as a current collector. For example, the cell component may be used solely for thermal control of the battery cell. Additionally, while embodiments illustrated and described herein predominantly described cooling battery cells, aspects of the present invention may be used to heat battery cells as may be required.

Therefore, in accordance with one aspect of the invention, a battery cell component comprises a current conducting element, wherein a portion of the current conducting element is hollow, further wherein the battery cell component is configured to be located within a battery cell.

In accordance with another aspect of the invention, a battery cell component comprises a first element defining a first fluid path therein; and a second element, defining a second fluid path, wherein the second fluid path is in fluid communication with the first fluid path, further wherein the battery cell component is configured to conduct electric current.

In accordance with another aspect of the invention, a battery cell comprises an anode; a cathode in communication with the anode; and a current collector, wherein a portion of the current collector is hollow, thereby defining a fluid path containing a fluid therein.

In accordance with another aspect of the invention, a battery pack assembly comprises a plurality of battery cells in electrical communication, wherein each of the plurality of battery cells comprise: an anode; a cathode in communication with the anode; and a current collector, wherein a portion of the current collector is hollow, thereby defining a fluid path therein; and a cooling system in fluid communication with the fluid path, the cooling system comprising at least one fluid channel.

In accordance with another aspect of the invention, a method of cooling comprises: connecting a cooling system to a battery pack assembly, said battery pack assembly comprising a plurality of battery cells electrically connected to each other, the cooling system comprising at least one fluid channel containing a fluid therein, the at least one fluid channel being in thermal communication with the plurality of battery cells; circulating a fluid in the least one fluid channel, thereby controlling a temperature of the plurality of battery cells.

The present invention has been described in terms of the preferred embodiment, and it is recognized that equivalents, alternatives, and modifications, aside from those expressly stated, are possible and within the scope of the appending claims.

What is claimed is:

1. A battery cell component comprising:
a current conducting element, wherein a portion of the current conducting element is hollow, thereby defining a fluid path comprising two substantially concentric streams of a fluid therein wherein the two streams are flowing in opposite directions and are in thermal communication with each other, wherein at least one end of said fluid path is open to an exterior of said current collector, further wherein the battery cell component is configured to be located within a battery cell, and further wherein the battery cell comprises a sodium-based battery cell.

2. The battery cell of claim 1, wherein the battery cell is configured to operate at a temperature in a range from about 280° C. to about 350° C.

3. A battery cell comprising:
a case housing containing:
a cathode;
an anode surrounding the cathode; and
the battery cell component of claim 1, wherein the battery cell component is located within the cathode.

4. A battery cell comprising:
an anode;
a cathode in communication with the anode; and
a current collector, wherein a portion of the current collector is hollow, thereby defining a fluid path comprising two substantially concentric streams of a fluid therein wherein the two streams are flowing in opposite directions and are in thermal communication with each other, wherein at least one end of said fluid path is open to an exterior of said current collector, and further wherein the battery cell comprises a sodium-based battery cell.

5. The battery cell of claim 4, wherein the battery cell is configured to operate at a temperature in a range from about 280° C. to about 350° C.

6. The battery cell of claim 4, wherein the current collector comprises a substantially longitudinal current collector.

7. The battery cell of claim 4, wherein the fluid comprises one of a liquid, a gas, and combinations thereof.

8. The battery cell of claim 7, wherein the gas comprises air.

9. The battery cell of claim 4, wherein the substantially longitudinal current collector comprises one of a metal and an alloy.

10. The battery cell of claim 4, wherein said fluid path circulates in and out of said current collector.

11. The battery cell component of claim 1, wherein said fluid path circulates in and out of said current collector.

12. The battery cell component of claim 1, wherein the fluid comprises air.

13. The battery cell component of claim 1, wherein said thermal communication comprises forced convection.

14. The battery cell component of claim 1, wherein said thermal communication is configured to create an uniform temperature along said fluid path.

15. The battery cell component of claim 14, wherein said uniform temperature is designed to accomplish low degradation rate of the battery cell.

16. The battery cell component of claim 4, wherein said thermal communication comprises forced convection.

17. The battery cell component of claim 4, wherein said thermal communication is configured to create an uniform temperature along said fluid path.

18. The battery cell component of claim 17, wherein said uniform temperature is designed to accomplish low degradation rate of the battery cell.

* * * * *